United States Patent
Diao et al.

(10) Patent No.: US 7,151,940 B2
(45) Date of Patent: Dec. 19, 2006

(54) METHOD AND APPARATUS FOR INCREASING ACCURACY FOR LOCATING CELLULAR MOBILE STATION IN URBAN AREA

(75) Inventors: Xinxi Diao, Shenzhen (CN); Gang Li, Shenzhen (CN); Weiming Duan, Shenzhen (CN); Jiang Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 10/673,219

(22) Filed: Sep. 30, 2003

(65) Prior Publication Data

US 2004/0063441 A1 Apr. 1, 2004

Related U.S. Application Data

(63) Continuation of application No. PCT/CN01/01163, filed on Jul. 9, 2001.

(30) Foreign Application Priority Data

Mar. 30, 2001 (CN) ............................... 01 1 05807

(51) Int. Cl.
*H04Q 7/20* (2006.01)
(52) U.S. Cl. ............................... 455/456.1; 455/404.2; 342/450; 340/988
(58) Field of Classification Search ............ 455/456.1, 455/404.2, 414.2, 457; 342/450, 457, 357.01, 342/357.06; 340/988, 426.19, 539.13, 825.36
See application file for complete search history.

(56) References Cited

U.S. PATENT DOCUMENTS 5,596,330 A * 1/1997 Yokev et al. ............... 342/387
5,926,133 A 7/1999 Green, Jr.
5,970,414 A 10/1999 Bi et al.
6,895,333 B1 * 5/2005 Hethuin et al. ........... 455/456.1
6,957,076 B1 * 10/2005 Hunzinger ................. 455/456.3
6,973,316 B1 * 12/2005 Hayakawa ................ 455/456.1

FOREIGN PATENT DOCUMENTS

WO       00/10028       2/2000

OTHER PUBLICATIONS

International Search Report, no date listed.
N. J. Thomas et al., "A Robust Location Estimator Architecture with Biased Kalman Filtering of TOA Data for Wireless Systems", *Spread Spectrum Techniques and Applications, 2000 IEEE Sixth International Symposium*, Piscataway, NJ, USA, Sep. 6-8, 2000, pp. 296-300.
Pi-Chun Chen, "A Cellular Based Mobile Location Tracking System", *Vehicular Technology Conference, 1999 IEEE 49"*, Houston, TX, USA, May 16-20, 1999, vol. 3, pp. 1979-1983.

* cited by examiner

*Primary Examiner*—Marsha D. Banks-Harold
*Assistant Examiner*—Nghi H. Ly
(74) *Attorney, Agent, or Firm*—Crowell & Moring LLP

(57) ABSTRACT

The invention provides a method and apparatus for increasing the accuracy for locating a cellular mobile station in an urban area. The method is performed as follows: at first, if there is a request for location, the approximate position of a mobile station is determined by sector information, the time of arrival, and a time difference of arrival; then, the transmission of a locating pilot frequency for an adjacent assistant locating apparatus is initiated, and in the case of the transmission of the assistant locating pilot frequency, the time difference of arrival is measured once again; at the end of the measurement of the mobile station, the locating transmission of the assistant locating apparatus is closed; the assistant locating apparatus is requested to report the result of NLOS identification; with the measurement of the assistant locating pilot frequency by the mobile station and the result of NLOS identification, the position of the mobile station is estimated to acquire a more accurate position of the mobile station.

10 Claims, 6 Drawing Sheets

METHOD AND APPARATUS FOR INCREASING ACCURACY FOR LOCATING CELLULAR MOBILE STATION IN URBAN AREA

This application is a continuation of international patent application no. PCT/CN01/01163, filed Jul. 9, 2001, designating the Unites States of America, the entire disclosure of which is incorporated herein by reference. Priority is claimed based on Chinese patent application no. 01105807.2, filed Mar. 30, 2001.

FIELD OF THE INVENTION

The present invention relates to a method and apparatus for increasing the accuracy for locating cellular mobile station in an urban area.

BACKGROUND OF THE INVENTION

Federal Communications Commission of USA (FCC) requires cellular mobile communication systems to be capable of locating mobile stations and explicitly specifies that in the case of assistant measurement of a mobile station, the probability of locating error being less than 50 meters be greater than 67% and the probability of locating error being less than 100 meters be greater than 95%. According to FCC regulations, dedicated technical specifications (25.305 and 25.395) are set down for locating a mobile station in emerging 3G mobile communication systems. Specification 25.395 requires explicitly assistant measurement capability of 3G mobile stations, which is necessary for locating capability. In addition, to ensure measurement performance, specification 25.305 puts forth a unique "Idle Period of Down Link" (IPDL) mode. However, because Non-Line-Of-Sight (NLOS) transmission paths exist ubiquitously in urban areas, there are severe NLOS errors in TDOA (time difference of arrival) measurement in urban areas, thus it is difficult to achieve the locating accuracy required by FCC in urban areas.

In urban areas, except for a few LOS paths, such as paths 103, 104 and 105, NLOS transmission paths exist almost ubiquitously between mobile stations and base stations, such as NLOS paths 106 and 107 in FIG. 1, and they are the primary reason for mobile station locating errors, which may be as high as several hundreds or even several thousands meters, and are difficult to eliminate.

Currently, there are mainly 2 approaches to decrease NLOS errors:

1) Intensive measurement is carried out in the urban area where NLOS exists to obtain a large quantity of empirical data about the distribution of channel multi-paths (amplitude measurement corresponds to the special case of mono-path). Then the position of the mobile station is corrected on the basis of the empirical data. Such an approach that improves the accuracy of locating a mobile station in urban areas through traversal measurement to obtain an empirical database requires vast workload. Moreover, once the urban area environment changes (e.g., when buildings are added or removed), the database will become invalid. To keep the database adapting to the changes of an urban area, usually a large quantity of measurement has to be performed.

2) Several locating reference points (e.g., transponders) are added in the urban area where NLOS exists to correct NLOS error of a mobile station according to the signal characteristics of those reference points. In U.S. Pat. No. 5,926,133, a method for increasing the accuracy for locating a mobile station is disclosed, as shown in FIG. 2. The basic idea of this method is to place some transponders in the area of a specified block 201 as an assistant locating apparatus 202 to improve accuracy for locating a mobile station. The basic principle of improving locating accuracy with the assistant locating apparatus 202 (the transponders) is: the signals sent from the mobile station 204 and the signals transmitted from nearby transponders 202 are received at the base station through similar transmission paths. For each transponder, two locations are obtained: one is the location obtained through measuring (e.g., TDOA) the signals sent from the transponder and then through estimating of the location, and an NLOS error is included in the location; the other is the location measured accurately in advance. Through comparing the two locations, the NLOS error value may be obtained. An NLOS error vector may be created with NLOS errors of the transponders adjacent to the mobile station, and the NLOS error of the mobile station may be corrected on the basis of the NLOS error vector. Cable 203 is used to transfer data and provide power in order to enable the transponder to work. Position 205 of the mobile station is estimated by the assistant locating apparatus under the influence of NLOS. The working process of the method described in the patent is: (1) determining the approximate location of the mobile station 204; (2) starting ambient transponders to determine the approximate locations of those transponders with the signals transmitted by them; (3) constructing an NLOS error vector with the approximate locations of those transponders; (4) correcting the approximate location of the mobile station with the NLOS error vector to obtain the accurate location of the mobile station 204. The advantages of the method are that it doesn't need any assistance from the mobile station, and that the method is suitable for locating mobile stations with up links, and can adapt to the environmental variations of urban areas by adding transponders. However, to ensure the correction accuracy of the NLOS error, transponders have to be configured with enough accuracy, which may result in increased network construction costs. In addition, in 3G communication systems, the location of a mobile station has to be determined through measuring TDOA for down link in the IPDL mode. However, the method and apparatus described in U.S. Pat. No. 5,926,133 cannot be used in the IPDL mode in 3G communication systems.

The object of the present invention is to provide a method and apparatus for effectively increasing the accuracy for locating cellular mobile stations in urban areas, in order to improve the signal transmission environment in NLOS urban areas to keep the probability of NLOS transmission paths in urban areas similar to in suburban areas.

SUMMARY OF THE INVENTION

To attain said object, the method for increasing the accuracy for locating cellular mobile stations in urban areas comprises the following steps: (1) determining whether there is any synchronous measurement request: if yes, initiating the synchronous measuring management for the assistant locating apparatus (including open and close transmission of RTD measuring pilot frequency); otherwise going to the next step; (2) determining whether there is any locating request; if yes, determining the approximate location of the mobile station to be located with the time of arrival, TDOA, and sector information of the base station; otherwise repeating said steps; (3) determining whether to open or close the transmission of locating pilot frequency from an adjacent assistant locating apparatus according to the approximate location of the mobile station; (4) if the assistant locating pilot frequency is opened, measuring the TDOA again, and then determining whether the measurement for the mobile station to be located is finished; if yes, closing the transmission of locating pilot frequency from the assistant locating apparatus; otherwise repeating the determination; (5) searching for and processing multi-paths and identifying NLOS paths according to the channel codes of the mobile station to be located, and requesting the assistant locating apparatus to report NLOS path identification result; (6) estimating the location of the mobile station with the measurement of assistant pilot frequency signals and NLOS path identification result to obtain a more accurate location of the mobile station.

In the above method for increasing the accuracy for locating a cellular mobile station in an urban area, the transmission of assistant pilot frequency and transmission of RTD measuring pilot frequency are both carried out intermittently.

In the above method for increasing the accuracy for locating a cellular mobile station in an urban area, the transmission of assistant pilot frequency and transmission of RTD measuring pilot frequency are both carried out in an independent transmission mode.

To attain the above object, the assistant locating apparatus of the present invention comprises an air interface transmitting/receiving antenna, a transmitting/receiving unit B wired to the air interface transmitting/receiving antenna, and a channel-processing unit B wired to the transmitting/receiving unit B, wherein the assistant locating apparatus also comprises a locating measurement unit-oriented antenna that opens/closes the transmission of RTD measuring pilot frequency; a mobile station-oriented transmitting/receiving antenna that opens/closes the transmission of assistant locating pilot frequency; a transmitting/receiving unit A that is connected to the locating measurement unit-oriented antenna and the mobile station-oriented transmitting/receiving antenna via a first feed line and a second feed line, said transmitting/receiving unit A comprising a transmitting unit and a receiving unit, and said transmitting unit sending RF signals to the locating measurement unit-oriented antenna and the mobile station-oriented transmitting/receiving antenna independently through symmetric circuits, and the channel-processing unit A controlling the transmission time and modulation mode of said RF signals, said receiving unit comprising an RF filter, a down frequency converter, and a multi-path receiver, said receiving unit being controlled by the channel-processing unit A and at the same time providing maximum ratio consolidation output and multi-path distribution output; a channel-processing unit A that mainly comprises a demodulating/decoding unit, an assistant locating pilot frequency or RTD measuring pilot frequency codes generating unit, an assistant locating pilot frequency transmission control unit, and a RTD pilot frequency transmission control unit; a LOS path identification unit that identifies LOS paths and NLOS paths according to the multi-path distribution of LOS paths and NLOS paths; a managing unit, which is responsible for communicating to the base station controller as well as controlling the LOS path identification unit, channel-processing unit A, and channel-processing unit B.

In the above assistant locating apparatus, the first feed line is similar to the second feed line in length.

DETAILED DESCRIPTION OF THE EMBODIMENTS

Figure 1:
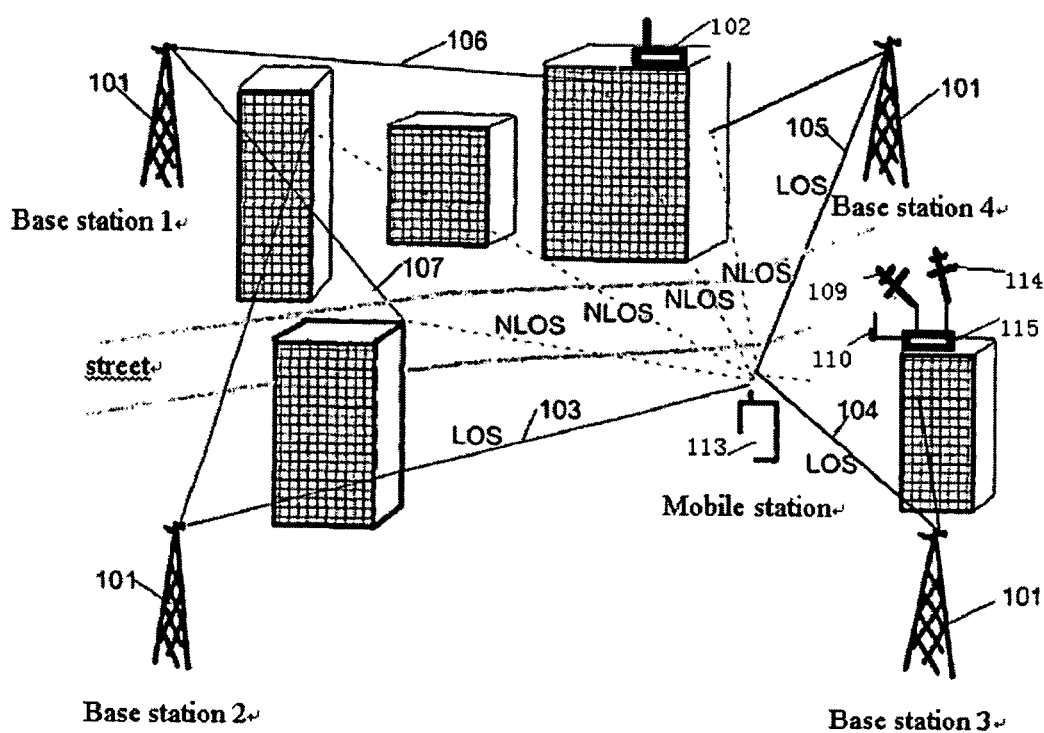
FIG. 1 shows the configuration relationship between the assistant locating apparatus for a mobile station and a cellular mobile communication system.
Figure 2:
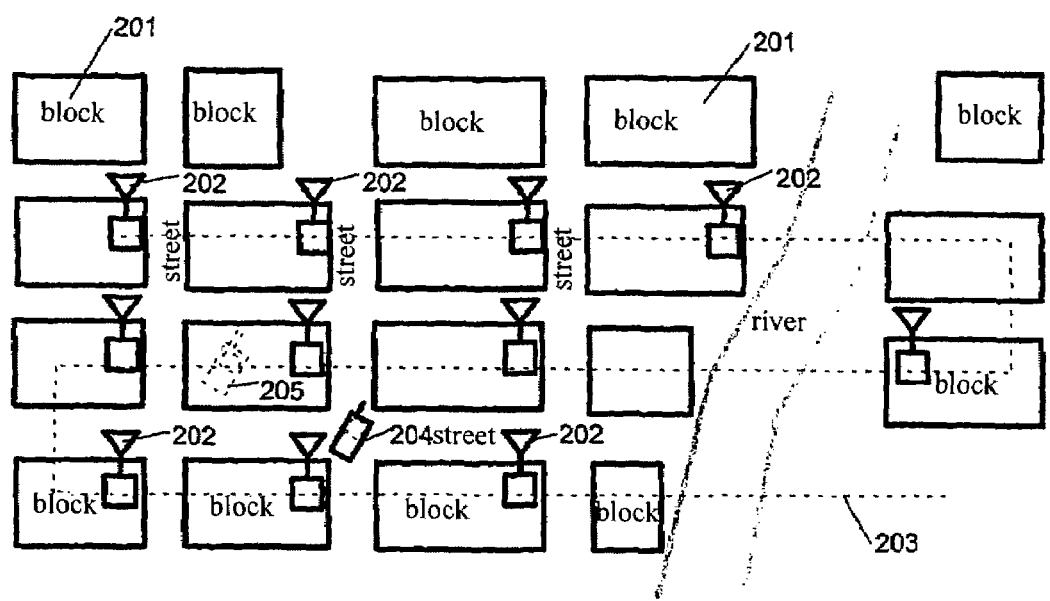
FIG. 2 shows the configuration relationship of an existing system that uses transmitter.

FIG. 1 shows the configuration relationship between the assistant locating apparatus for a mobile station and the cellular mobile communication system, wherein the assistant locating apparatus is used only when the locating error resulted from NLOS exceeds the specifications for a mobile station to be located. Several base station 101 and buildings are distributed around the mobile station 113. Due to the blockage of those buildings, signals from at least some of the base stations (e.g., base station 1 or 2) cannot be transmitted to the mobile station 113 directly. To increase LOS in the area where the mobile station 113 is located, an assistant locating apparatus is added in FIG. 1. The assistant locating apparatus in FIG. 1 comprises a RTD measuring antenna 109, an assistant locating pilot frequency transmitting antenna 110, an air interface antenna 114, a processor 115, and corresponding feed lines.

In FIG. 1, the RTD measuring antenna 109 faces the locating measurement unit (LMU) 102 and keeps a LOS path to the LMU receiving antenna. The assistant locating pilot frequency transmitting antenna 110 faces the mobile station, and its installation location shall be selected based on the principle of acquiring the maximum direct-view area. Therefore, it usually is not deployed at the same location as the RTD measuring transmitting antenna. The air interface antenna 114 faces the base station (station 4). The assistant locating apparatus receives data from the base station controller via the antenna 114 and sends the data (e.g., NLOS identification result) required by the base station controller to the base station controller. However, it is noted that the air interface is not the only approach to implement the communication between the assistant locating apparatus and the base station controller. In fact, the base station controller may communicate with the assistant locating apparatus via a cable interface.

Figure 5:
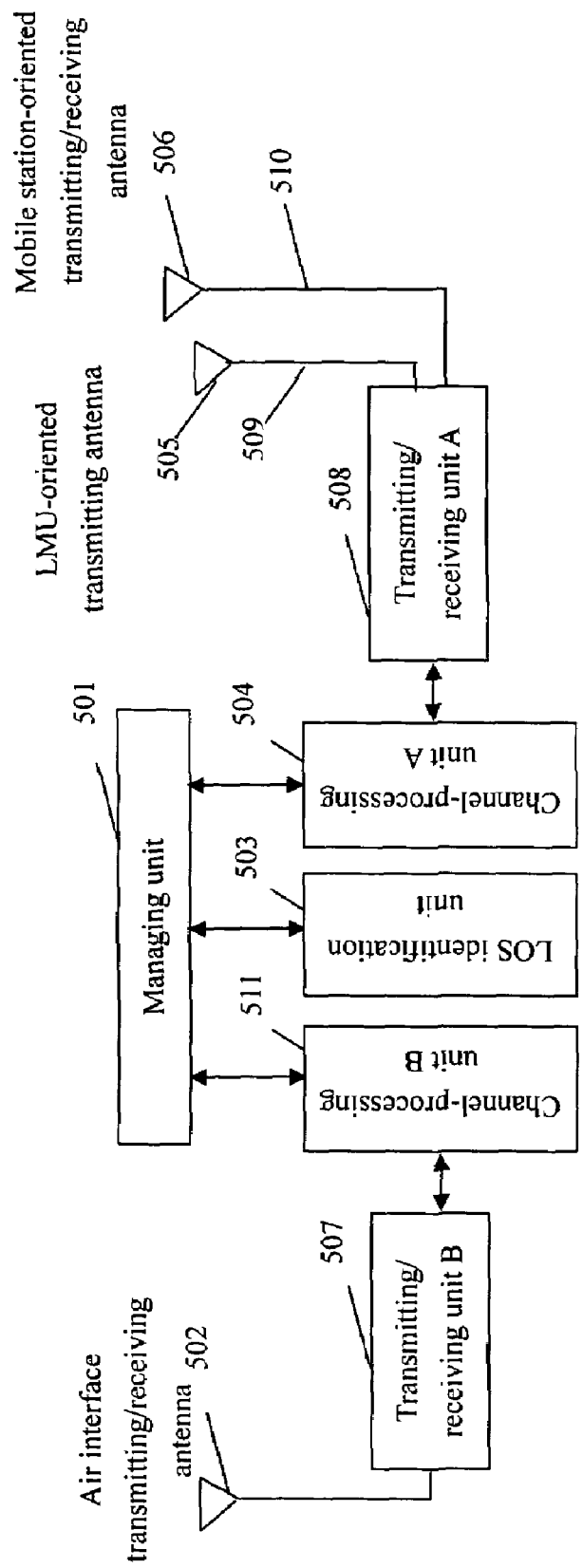
FIG. 5 is a structure diagram of the function of the assistant locating apparatus for the mobile station.

As shown in FIG. 5, the assistant locating apparatus for the mobile station comprises a managing unit 501, a LMU-oriented transmitting antenna 505, a mobile station-oriented transmitting/receiving antenna 506, a transmitting/receiving unit A 508, a channel-processing unit A 504, a LOS identification unit 503, an air interface transmitting/receiving antenna 502, a transmitting/receiving unit B 507, and a channel-processing unit B 511, and the wiring among those components is shown in FIG. 5. In addition, the air interface transmitting/receiving antenna 502, the transmitting/receiving unit B 507, and the channel-processing unit B 511 may be replaced by cable interfaces.

The managing unit 501 is responsible for communicating with the base station controller and for controlling LOS identification unit 503 and channel-processing unit A 504. For example, the managing unit 501 receives the channel code of the mobile station to be located transmitted from the base station controller and controls the channel unit A to search for the channel code and obtain multi-path distribution information of the channel code, and then controls the channel-processing unit A to send the multi-path distribution information to the NLOS identification unit. Finally, it retrieves the identification result from the NLOS identification unit, and then sends the result to the base station controller for NLOS error correction at an appropriate time.

The LMU-oriented antenna 505 is connected to the transmitting/receiving unit A 508 via the first feed line 509 to open/close the transmission of RTD measuring pilot frequency. The mobile station-oriented transmitting/receiving antenna 506 is connected to the transmitting/receiving unit A 508 via the second feed line 510 to open/close the transmission of assistant locating pilot frequency. To ensure the validity of RTD measurement, the difference of length between the first feed line 509 and the second feed line 510 shall be as small as possible ($\leq 20$ m).

The transmitting/receiving unit A 508 comprises a transmitting unit and a receiving unit, wherein the transmitting unit sends RF signals to antenna 505 and antenna 506 independently through symmetric circuits. The channel-processing unit A 504 controls the output time and modulation mode of the RF signals. The symmetric circuit structure of the transmitting unit of transmitting/receiving unit A 508 to antenna 505 and antenna 506 ensures the consistency of delay. The receiving unit of transmitting/receiving unit A 508 comprises an RF filter, a down frequency converter, and a RAKE receiver. Said receiving unit delivers maximum ratio consolidation output and multi-path distribution output simultaneously under the control of the channel-processing unit A 504.

The channel-processing unit A 504 mainly comprises a demodulating/decoding unit, an assistant locating pilot frequency (or RTD measuring pilot frequency) code-generating unit, an assistant locating pilot frequency transmission control unit, and a RTD measuring pilot frequency transmission control unit.

The LOS identification unit identifies LOS and NLOS paths according to the characteristics of multi-path distribution (e.g., compared with LOS, paths of NLOS have smooth amplitude fading and good delay expansion.

The composition and function of the air interface transmitting/receiving antenna 502, the transmitting/receiving unit B 507, and channel-processing unit B 511 are similar to those of an ordinary mobile station.

Figure 3:
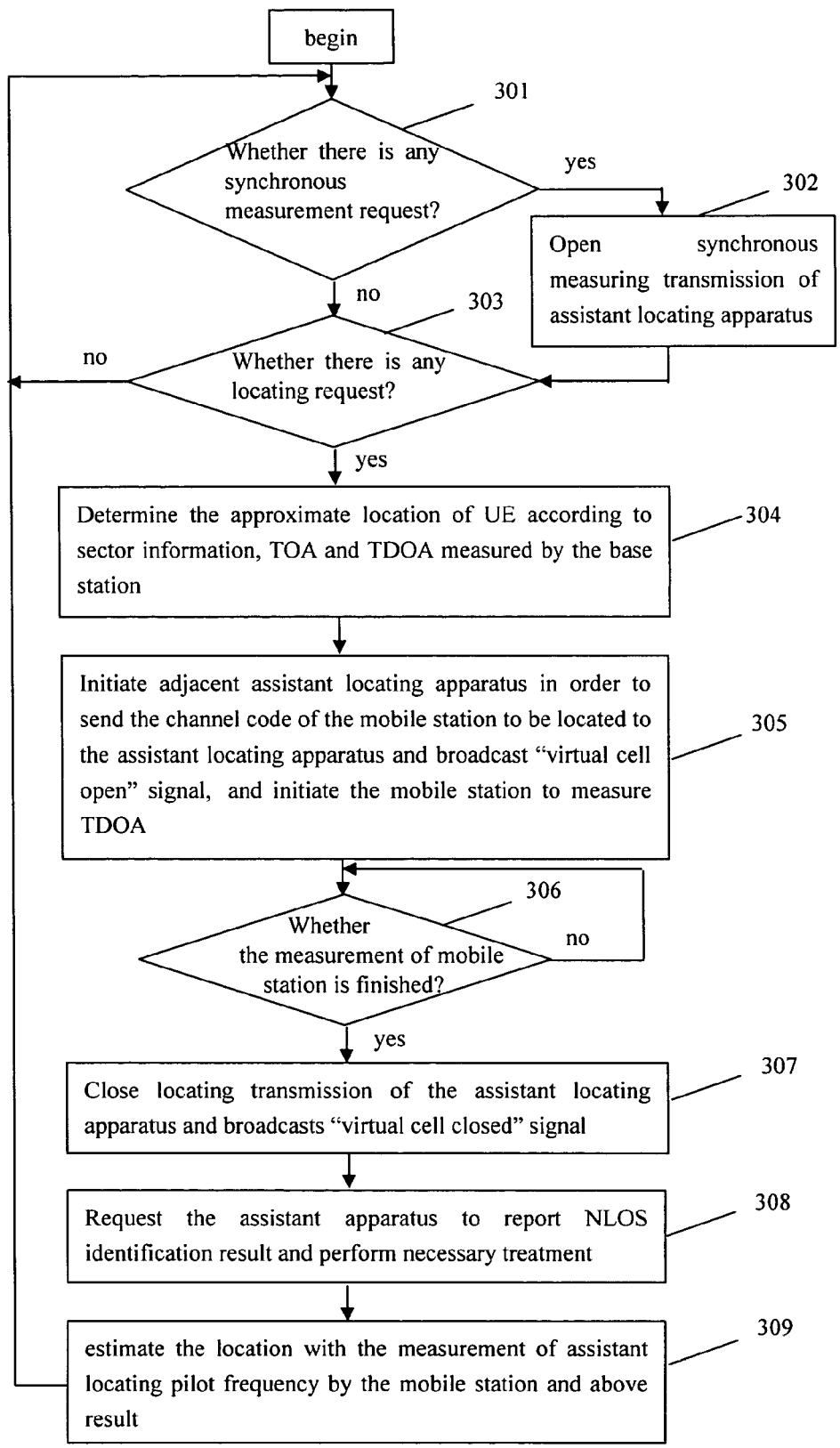
FIG. 3 is a diagram in which the base station controller controls the assistant locating apparatus for a mobile station according to the method of the present invention.

FIG. 3 shows the method for increasing the accuracy for locating a mobile station.

To increase the accuracy for locating a mobile station with an assistant locating apparatus, the following basic principles should be followed:

1) Decrease the impact of the assistant apparatus to the capacity of the cell as much as possible;
2) Ensure the observability of the synchronous relationship between the assistant locating apparatus and the base station; and
3) Provide assistant information necessary for correcting NLOS error.

According to the above principles, the method for increasing the accuracy for locating cellular mobile station in an urban area comprises the following steps:

1) determine whether there is any synchronous measurement request; if yes, initiate the synchronous measuring management for the assistant locating apparatus (including open and close transmission of RTD measuring pilot frequency); otherwise go to the next step;
2) determine whether there is any locating request; if yes, determine the approximate location of the mobile station to be located with the time of arrival, TDOA, and sector information of the base station; otherwise repeat said steps;
3) determine whether to open/close the transmission of locating pilot frequency from an adjacent assistant locating apparatus according to the approximate location of the mobile station;
4) if the assistant locating pilot frequency is opened, measure the TDOA again, and then determine whether the measurement for the mobile station to be located is finished; if yes, the transmission of locating pilot frequency from the assistant locating apparatus is closed; otherwise repeat the determination;
5) search for and process multi-paths and identify NLOS paths according to the channel codes of the mobile station to be located, and request the assistant locating apparatus to report NLOS path identification result; and
6) estimate location of the mobile station with the measurement of assistant pilot frequency signals and NLOS path identification result to obtain more accurate location of the mobile station.

The accuracy for locating a mobile station is increased by jointly using the base station controller and the assistant locating apparatus according to the present invention. The method comprises the managing part shown in FIG. 3 and the function-executing part shown in FIG. 4.

The managing part implemented in the base station controller comprises 3 basic functions: 1) RTD measuring management; 2) assistant locating pilot frequency transmission management; and 3) NLOS identification management.

A flowchart of the management method is shown in FIG. 3. The steps related with RTD measurement of the assistant apparatus comprises step 301 and 302 shown in FIG. 3. The assistant locating pilot frequency transmission management comprises steps 303 to 307 shown in FIG. 3. The modules related with NLOS identification management comprises steps 305 and 308 and estimation of location of mobile station 309 shown in FIG. 3.

Figure 4:
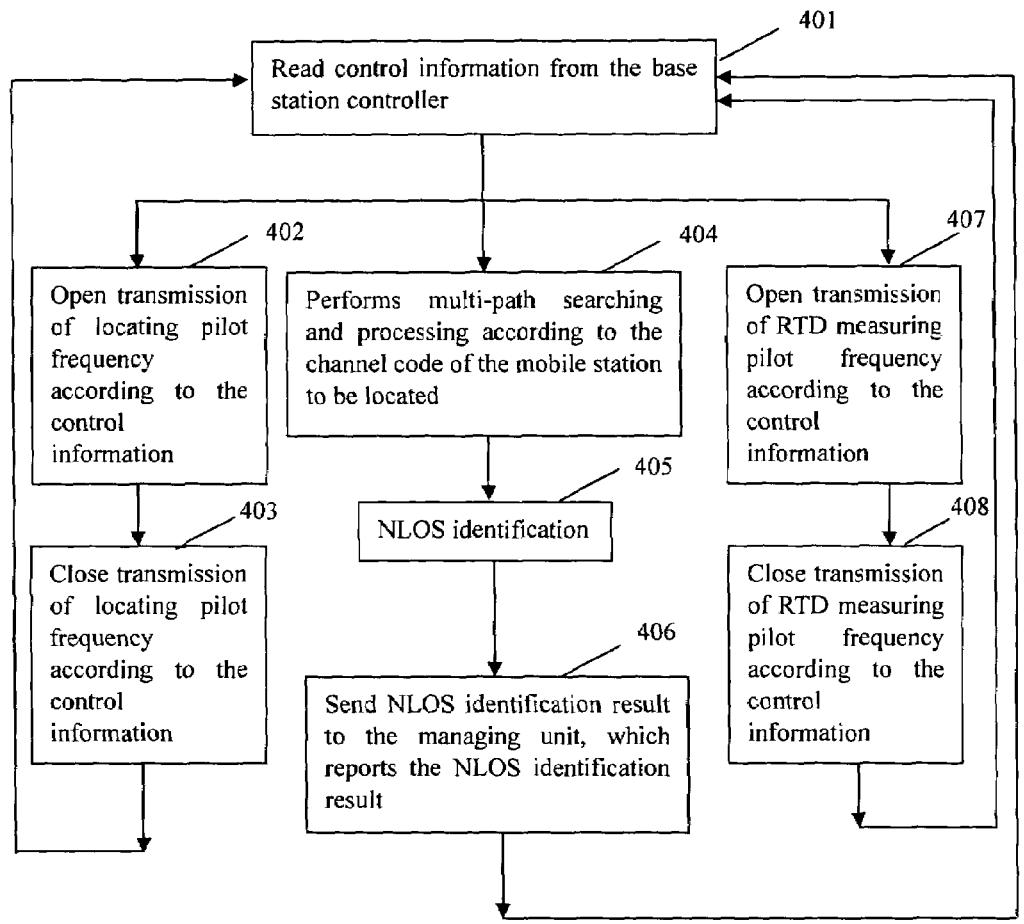
FIG. 4 is a flowchart of the basic function of the assistant locating apparatus for the mobile station.

At step 401, the control information from the base station controller is read. After step 401, the basic functions of the assistant locating apparatus are executed, as shown in FIG. 4, and comprise 3 basic steps corresponding to the managing part: 1) open/close of RTD measuring pilot frequency, which is implemented in step 402 and 403 shown in FIG. 4; 2) open/close of assistant pilot frequency, which is implemented in step 407 and 408 shown in FIG. 4; and 3) identification of NLOS, which comprises steps 404, 405, and 406.

Figure 6:
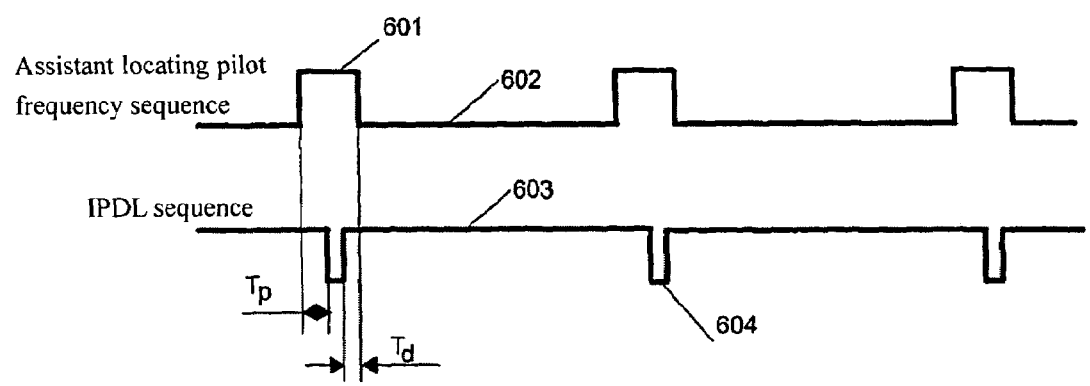
FIG. 6 shows the time relationship between assistant pilot frequency sequence and IPDL sequence.

To ensure that the assistant locating pilot frequency is in the transmission state during the measurement of the mobile station, the assistant pilot frequency shall be transmitted one Tp ahead before the IPDL arrives and hold for one Td after IPDL. The corresponding relationship between the transmission duration of assistant locating pilot frequency 601 and the duration of IPDL 604 is shown in FIG. 6. The values of Tp and Td depend on network synchronization capability and the installation location of the assistant locating apparatus. If it is easy to control network synchronization, lower values may be selected for them. Otherwise larger values should be selected. 602 is the OFF State Duration of assistant locating pilot frequency from the assistant locating apparatus. 603 is the OFF State Duration of pilot frequency from the base station.

When there is no locating request for the mobile station, the assistant locating pilot frequency is in a virtual transmission state, i.e., though the channel unit it generates assistant locating pilot frequency continuously. The pilot frequency is not sent to the transmitting unit. Instead, only when a RTD measurement request or mobile station locating request is received, the pilot frequency is sent to the corresponding transmitting unit. That approach not only ensures the validity of RTD measurement, but also reduces the impact of transmission of assistant locating pilot frequency and RTD measuring pilot frequency to the cell.

INDUSTRIAL APPLICABILITY

With the above technical solution, the accuracy for locating a mobile station in an urban area may be increased to be similar to that in a suburb area by adding the assistant locating apparatus from the viewpoint of altering the electric wave transmission environment. In addition, NLOS identification technology may be used in the assistant locating apparatus to increase the accuracy for locating a mobile station in an urban area by correcting NLOS. The assistant locating apparatus works in an intermittent transmission mode, which reduces the impact of transmission of pilot frequency to the capacity of the cell. The assistant locating pilot frequency transmission channel and the RTD measuring pilot frequency transmission channel employ symmetric structure (including symmetry in the circuit structure and similarity in the feed line for antenna) and independent dual-antenna structure, ensuring the accuracy of RTD measurement and flexibility of system deployment. The combination of omni-directional antenna used for the assistant locating pilot frequency transmission channel and directional antenna used for the RTD measuring pilot frequency transmission channel not only ensures a large coverage of assistant locating pilot frequency, but also reduces the interference to normal communication during RTD measurement. The invention is applicable for the IPDL locating mode required for 3G mobile communications. Compared to U.S. Pat. No. 5,926,133, the amount of assistant locating apparatus required in the invention to cover the same urban area is far less, thus the invention may help to decrease production costs of the system.

What is claimed is:

1. A method for increasing accuracy for locating a cellular mobile station in an urban area, comprising the following steps:
   1) determining whether there is any synchronous measurement request, and if yes, initiating the synchronous measuring management for an assistant locating apparatus (including opening and closing transmission of round-trip delay (RTD) measuring pilot frequency); otherwise proceeding to the next step;
   2) determining whether there is any locating request, and if yes, determining approximate location of the mobile station to be located with time of arrival, time difference of arrival (TDOA) and sector information of a base station; otherwise returning to step 1;
   3) determining whether to open or close transmission of locating pilot frequency from an adjacent assistant locating apparatus according to the approximate location of the mobile station;
   4) if an assistant locating pilot frequency is opened, measuring the TDOA again, and then determining whether the measurement for the mobile station to be located is finished; if yes, closing the transmission of the locating pilot frequency from the assistant locating apparatus; otherwise repeating the determination step;
   5) searching for and processing multi-paths and identifying Non-Line-Of-Sight (NLOS) paths according to channel codes of the mobile station to be located, and requesting the assistant locating apparatus to report NLOS path identification result; and
   6) estimating the location of the mobile station with the measurement of assistant pilot frequency signals and NLOS path identification result to obtain a more accurate location of the mobile station.

2. A method according to claim 1, wherein the transmission of the assistant pilot frequency and the transmission of the RTD measuring pilot frequency are both carried out intermittently.

3. A method according to claim 2, wherein the transmission of the assistant pilot frequency and the transmission of the RTD measuring pilot frequency are both carried out in an independent transmission mode.

4. An assistant locating apparatus implementing claim 1, comprising an air interface transmitting/receiving antenna, a transmitting/receiving unit B wired to the air interface transmitting/receiving antenna, and a channel-processing unit B wired to the transmitting/receiving unit B, wherein the assistant locating apparatus also comprises:
   a locating measurement unit-oriented antenna that opens/closes transmission of the RTD measuring pilot frequency;
   a mobile station-oriented transmitting/receiving antenna that opens/closes transmission of the assistant locating pilot frequency;
   a transmitting/receiving unit A that is connected to the locating measurement unit-oriented antenna and the mobile station-oriented transmitting/receiving antenna via a first feed line and a second feed line, wherein said transmitting/receiving unit A comprises a transmitting unit and a receiving unit, and wherein said transmitting unit sends RF signals to said locating measurement unit-oriented antenna and the mobile station-oriented transmitting/receiving antenna independently through symmetric circuits, and wherein the channel-processing unit A controls transmission time and modulation mode of said RF signals, wherein said receiving unit comprises a RF filter, a down frequency converter, and a multi-path receiver, and wherein said receiving unit is controlled by the channel-processing unit A and at the same time providing maximum ratio consolidation output and multi-path distribution output;
   a channel-processing unit A which mainly comprises a demodulating/decoding unit, an assistant locating pilot frequency or RTD measuring pilot frequency codes generating unit, an assistant locating pilot frequency transmission control unit, and a RTD pilot frequency transmission control unit;
   an Line-Of-Sight (LOS) path identification unit which identifies Line-Of-Sight (LOS) paths and NLOS paths according to multi-path distribution of the LOS paths and the NLOS paths;
   a managing unit, which is responsible for communicating with a base station controller as well as for controlling the LOS path identification unit, channel-processing unit A, and channel-processing unit B.

5. An assistant locating apparatus according to claim 4, wherein the first feed line is similar to the second feed line in length.

6. An assistant locating apparatus according to claim 4, wherein the first feed line is similar to the second feed line in length.

7. A method for increasing accuracy for locating a cellular mobile station in an urban area, the method comprising the steps of:
1) determining whether there is a synchronous measurement request;
2) if there is no synchronous measurement request, proceeding to step 4);
3) if there is a synchronous measurement request, initiating synchronous measuring management for an assistant locating apparatus, including opening and closing transmission of round-trip delay (RTD) measuring pilot frequency;
4) determining whether there is a locating request;
5) if there is no locating request, going to step 1;
6) if there is a locating request, determining an approximate location of the mobile station to be located with a time of arrival, time difference of arrival (TDOA) and sector information of a base station;
7) determining whether to open and/or close transmission of a locating pilot frequency from an adjacent assistant locating apparatus according to the approximate location of the mobile station;
8) if an assistant locating pilot frequency is opened, measuring the TDOA again, and then determining whether the measurement for the mobile station to be located is completed;
9) if the measurement for the mobile station to be located is completed, closing transmission of locating pilot frequency from the assistant locating apparatus, and if the measurement for the mobile station to be located is not completed, repeating determination of whether the measurement for the mobile station to be located is completed;
10) searching for and processing multi-paths, identifying NLOS paths according to channel codes of the mobile station to be located, and requesting the assistant locating apparatus to report NLOS path identification result; and
11) estimating location of the mobile station with measurement of assistant pilot frequency signals and the NLOS path identification result to obtain a more accurate location of the mobile station.

8. A method according to claim 7, wherein the transmission of the assistant pilot frequency and the transmission of the RTD measuring pilot frequency are both carried out intermittently.

9. A method according to claim 8, wherein the transmission of the assistant pilot frequency and the transmission of the RTD measuring pilot frequency are both carried out in an independent transmission mode.

10. An assistant locating apparatus comprising
an air interface transmitting/receiving antenna;
a transmitting/receiving unit B connected to the air interface transmitting/receiving antenna;
a channel-processing unit B connected to the transmitting/receiving unit B;
a locating measurement unit-oriented antenna that opens/closes transmission of a round-trip delay (RTD) measuring pilot frequency;
a mobile station-oriented transmitting/receiving antenna that opens/closes transmission of an assistant locating pilot frequency;
a transmitting/receiving unit A that is connected to the locating measurement unit-oriented antenna and the mobile station-oriented transmitting/receiving antenna via a first feed line and a second feed line, respectively, the transmitting/receiving unit A comprises a transmitting unit and a receiving unit, wherein the transmitting unit sends RF signals to the locating measurement unit-oriented antenna and the mobile station-oriented transmitting/receiving antenna independently through symmetric circuits, wherein the channel-processing unit A controls transmission time and modulation mode of the RF signals, wherein the receiving unit comprises a RF filter, a down frequency converter, and a multi-path receiver, and wherein the receiving unit is controlled by the channel-processing unit A and at the same time provides maximum a ratio consolidation output and a multi-path distribution output;
a channel-processing unit A that comprises a demodulating/decoding unit, an assistant locating pilot frequency or RTD measuring pilot frequency codes-generating unit, an assistant locating pilot frequency transmission control unit, and a RTD pilot frequency transmission control unit;
a Line-Of-Sight (LOS) path identification unit that identifies LOS paths and NLOS paths according to the multi-path distribution of LOS paths and Non-Line-Of-Sight (NLOS) paths;
a managing unit, which is responsible for communicating with a base station controller and for controlling the LOS path identification unit, channel-processing unit A, and channel-processing unit B.

* * * * *